United States Patent [19]

Aine

[11] 4,178,690
[45] Dec. 18, 1979

[54] METHOD FOR MAKING A SWIMMING POOL COVER TEMPLATE

[76] Inventor: Harry E. Aine, 1804 Stierlin Rd., Mountain View, Calif. 94040

[21] Appl. No.: 758,021

[22] Filed: Jan. 7, 1977

Related U.S. Application Data

[63] Continuation-in-part of Ser. No. 734,349, Oct. 20, 1976, abandoned, which is a continuation-in-part of Ser. No. 613,443, Sep. 15, 1975, Pat. No. 3,927,427, which is a continuation-in-part of Ser. No. 367,198, Jun. 5, 1973, abandoned.

[51] Int. Cl.$^2$ .............................................. G01B 3/00
[52] U.S. Cl. .................................. 33/174 G; 4/172.14; 33/1 G
[58] Field of Search ............ 33/174 G, 174 B, 174 A, 33/1 G, 1 K, 17 R, 6 12, 5; 4/172.12, 172.14, 172; 35/26; 52/2, 169.7, 169.8; 29/407, 559

[56] References Cited

U.S. PATENT DOCUMENTS

| | | | |
|---|---|---|---|
| 3,484,952 | 12/1969 | Coldren | 35/26 |
| 3,579,657 | 5/1971 | Gurrieri | 4/172.12 |
| 3,711,873 | 1/1973 | Katzman | 4/172.12 |
| 3,747,131 | 7/1973 | Koliomichalis | 4/172.12 |
| 3,889,303 | 6/1975 | Kinzel | 4/172.13 |

*Primary Examiner*—William D. Martin, Jr.
*Attorney, Agent, or Firm*—Harry E. Aine

[57] ABSTRACT

A thermally insulative buoyant swimming pool cover floats on the surface of the pool for covering the pool and for retaining the heat within the pool. Sinking means, such as weights or a mechanical pull-down structure, may be secured to the pool cover along certain predetermined action lines such as fold lines. In one embodiment, an inflatable and deflatable bladder is coupled to the weights. The bladder is dimensioned relative to the weights such that when inflated it overcomes the negative buoyancy of the weights to retain the pool cover in the fully covered position. However, when the bladder is deflated, the weights ovecome the positive buoyancy of the cover along the certain fold lines causing the cover to be at least partially pulled below the surface of the pool and folded while at the same time being retracted against one of the side walls of the pool. Pool water is circulated over or through channels of the pool cover to provide solar heating. Pool water is circulated over the top of the cover for cleaning thereof. The weights, in one embodiment, are hollow to receive the inflatable bladders. Air permeable structures are contained within the bladders to obtain more uniform inflation thereof. The lip of the cover contains additional positive buoyancy for additional support at the lip. In an alternative embodiment, air and water are fed into a container or conduit portion of the cover, the ratio by volume of air to water is changed for switching the cover between a pool covering and a pool uncovering state. Air is injected via a venturi into the pool return line which is connected to the cover. The air and water mixture is fed through solar heating channels of the cover for solar heating of the pool water.

2 Claims, 37 Drawing Figures

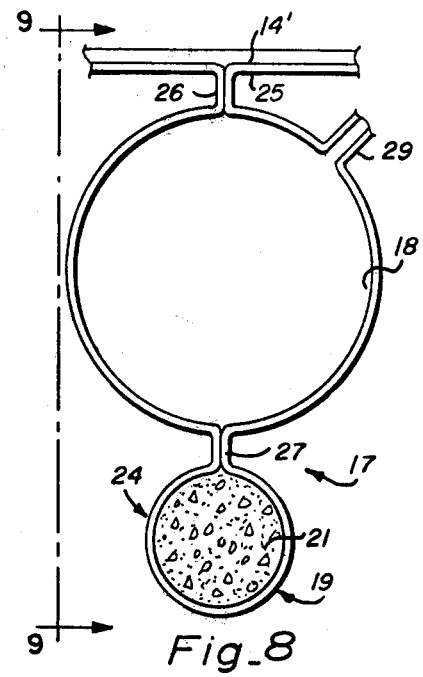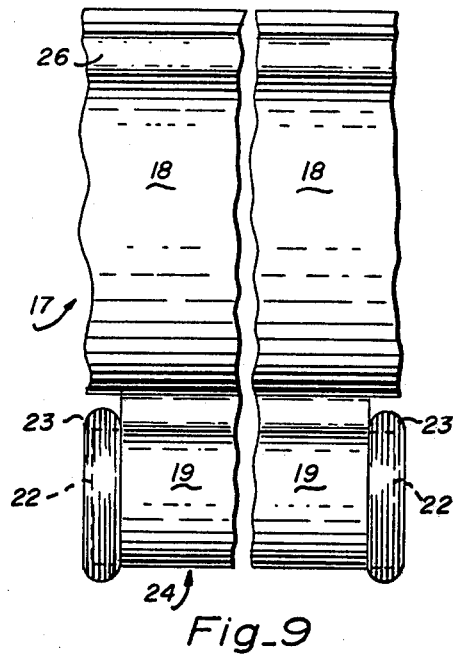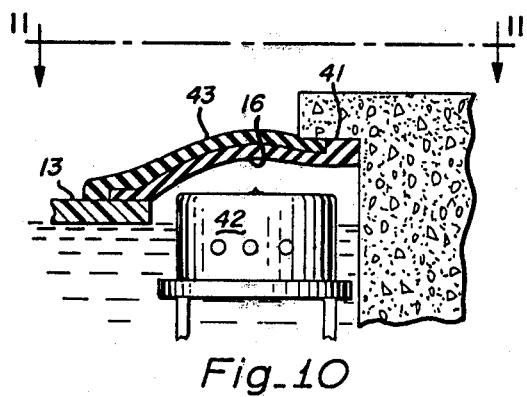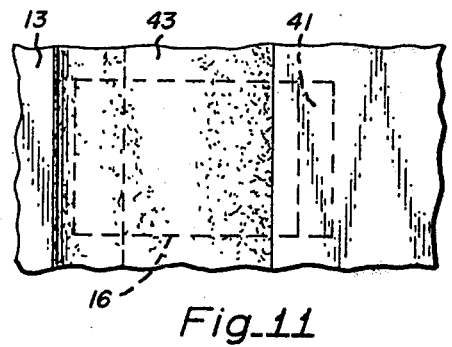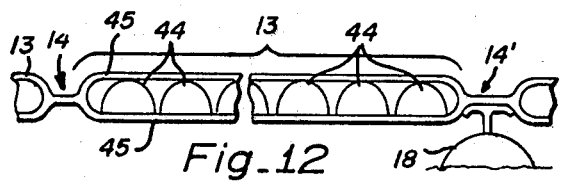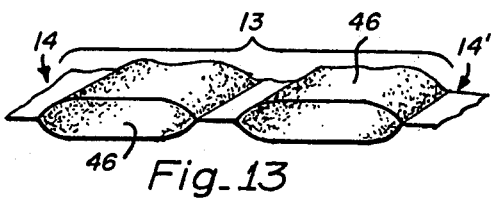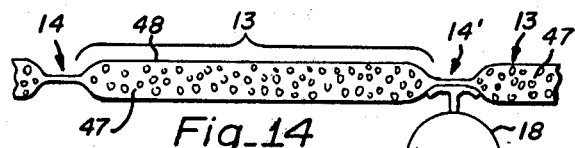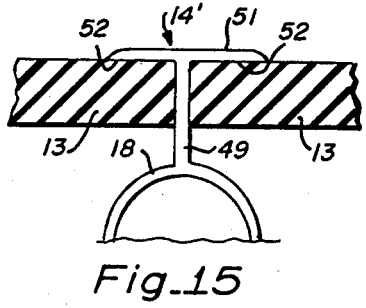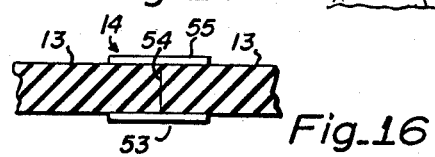

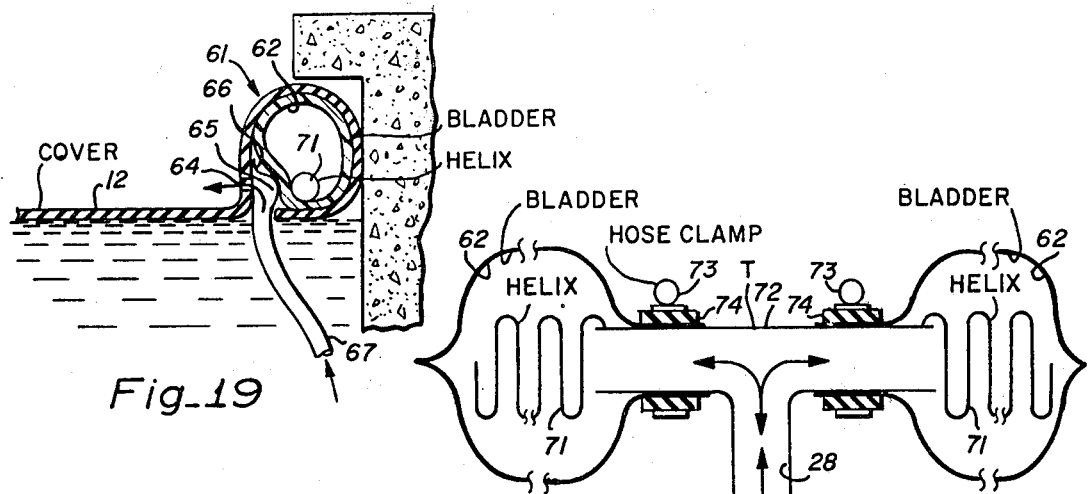
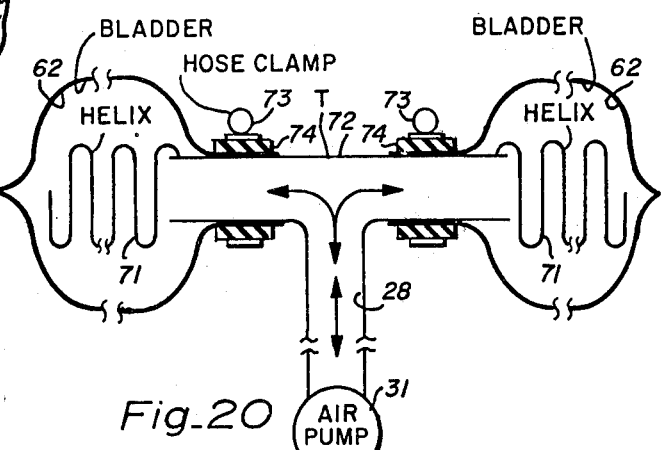
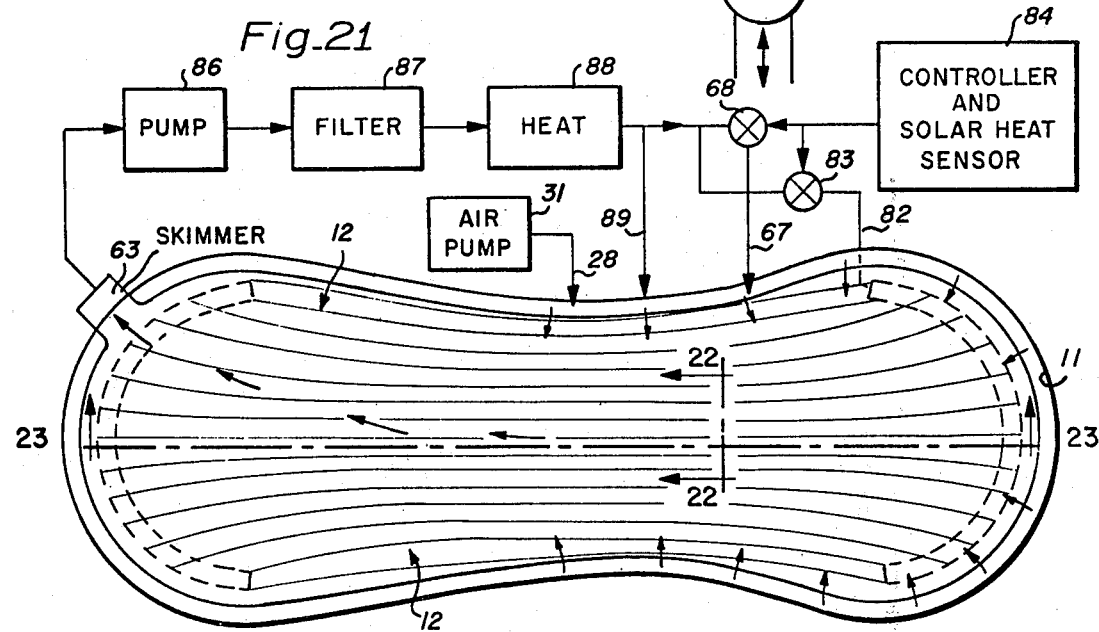
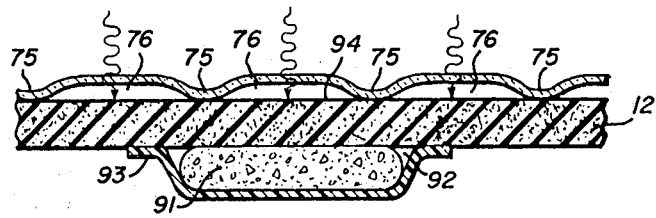

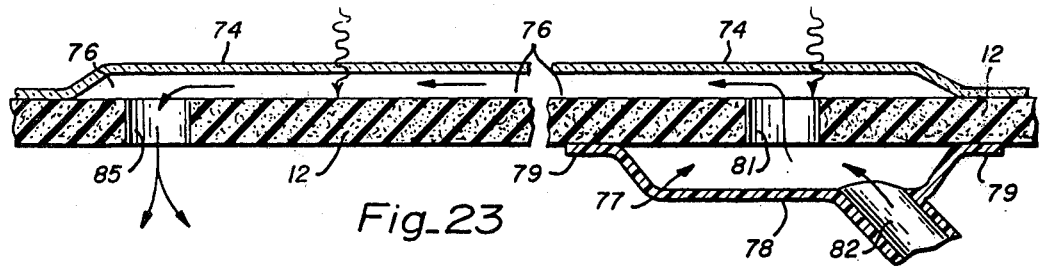
Fig. 23
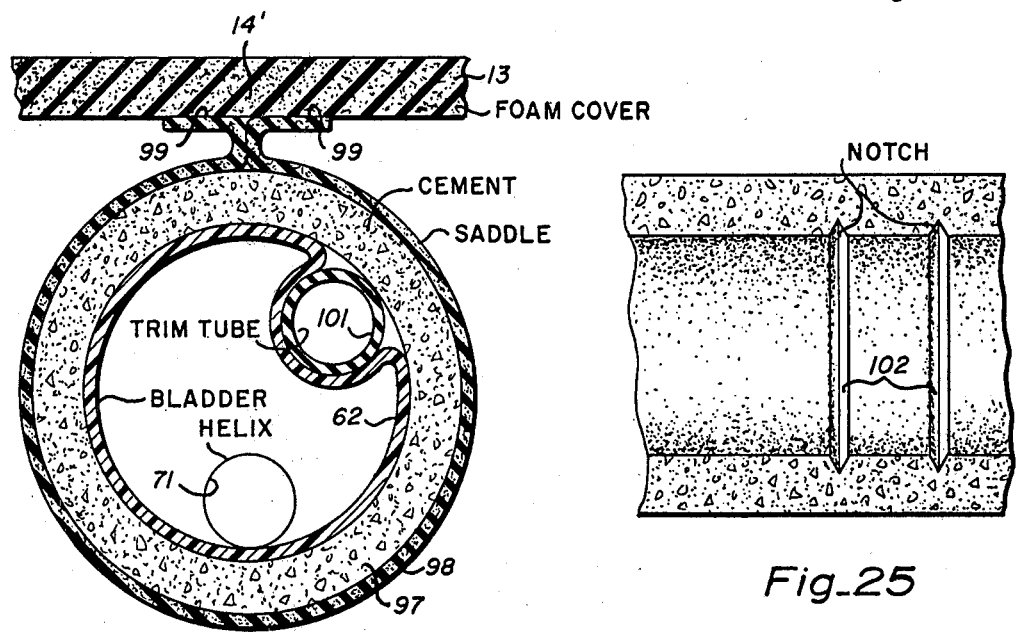
Fig. 24
Fig. 25
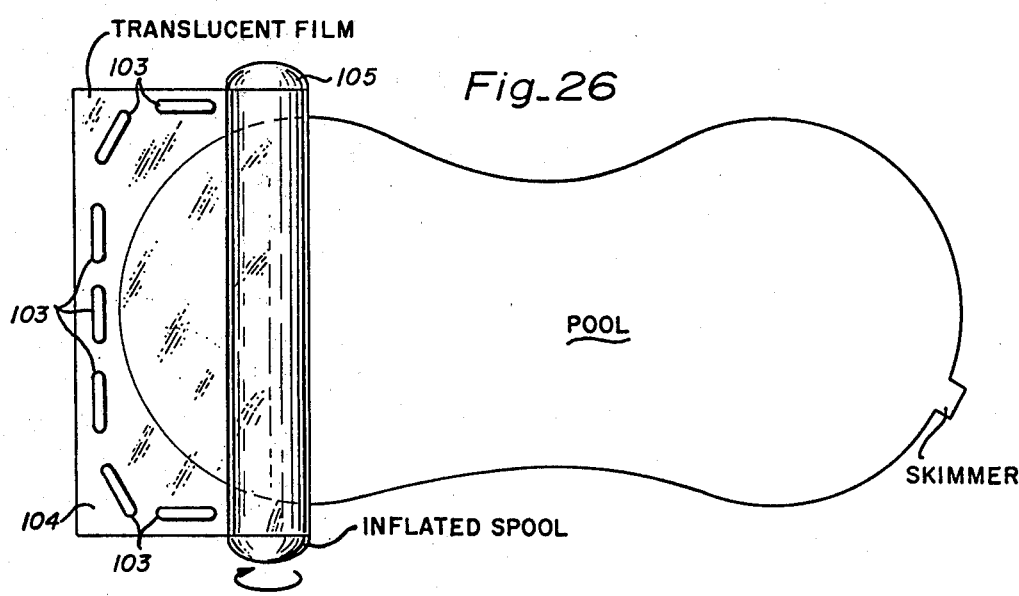
Fig. 26

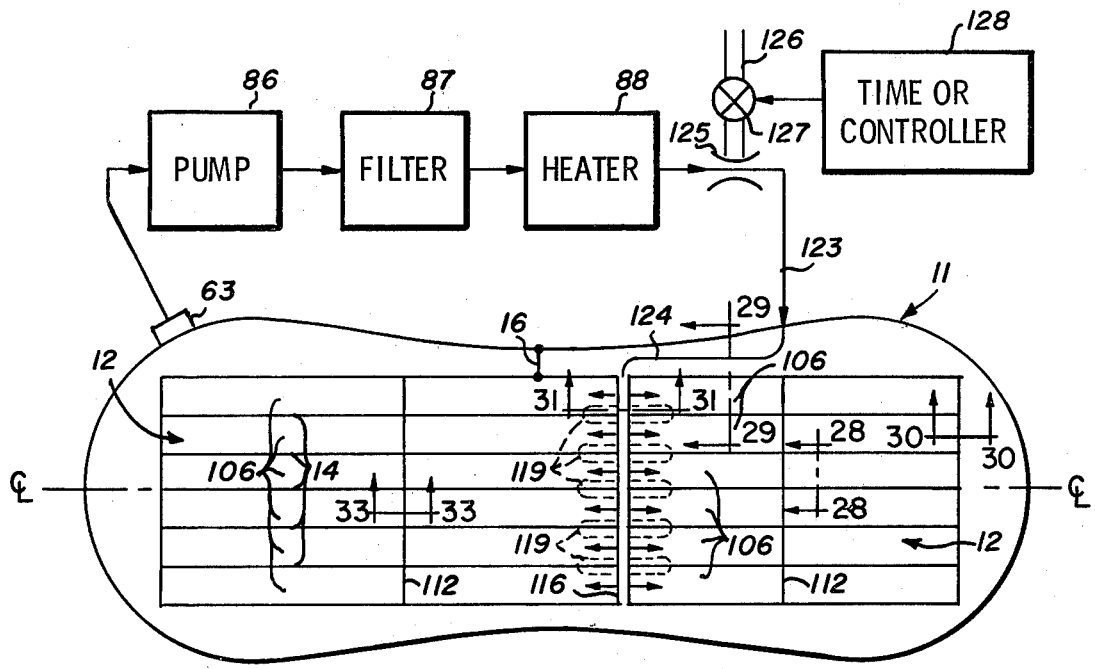
Fig_27
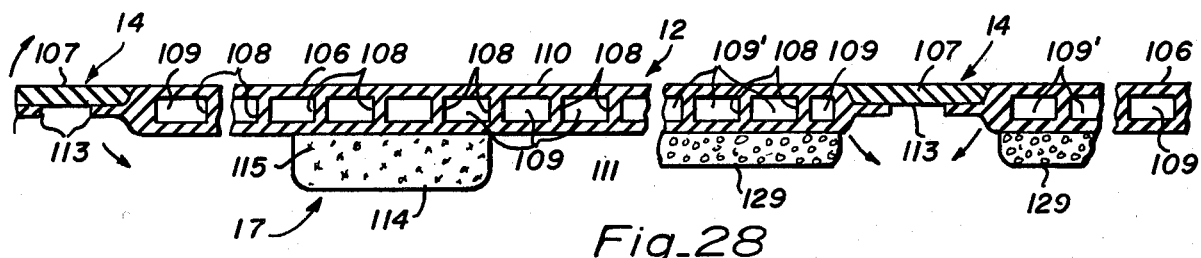
Fig_28
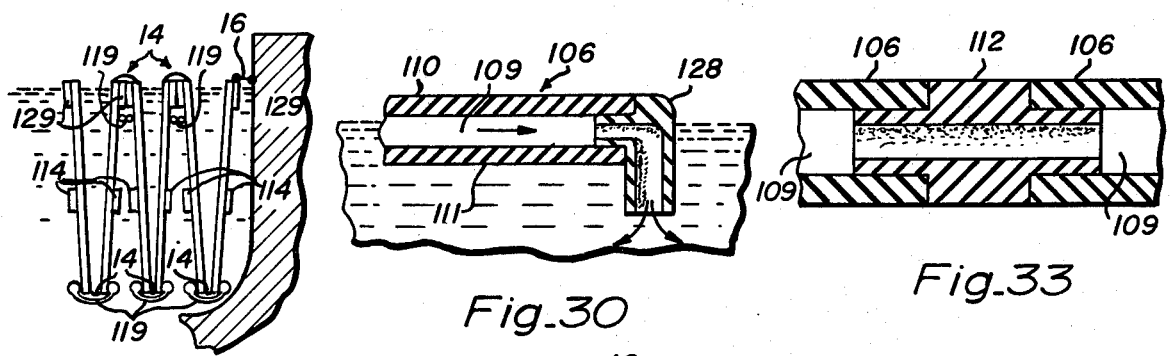
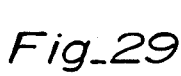
Fig_29
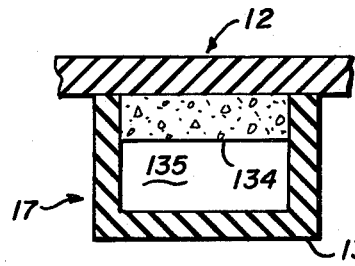
Fig_34

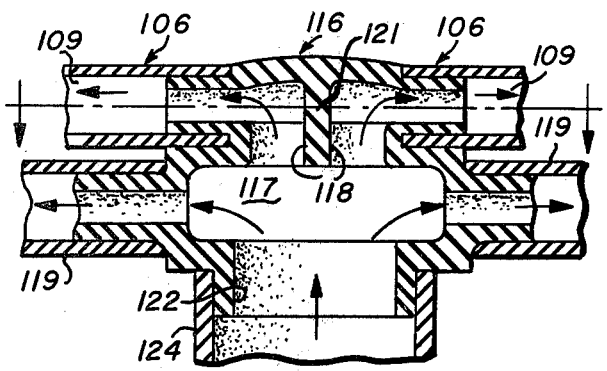
Fig_31
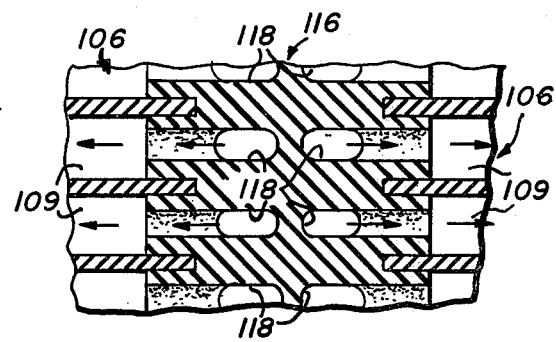
Fig_32
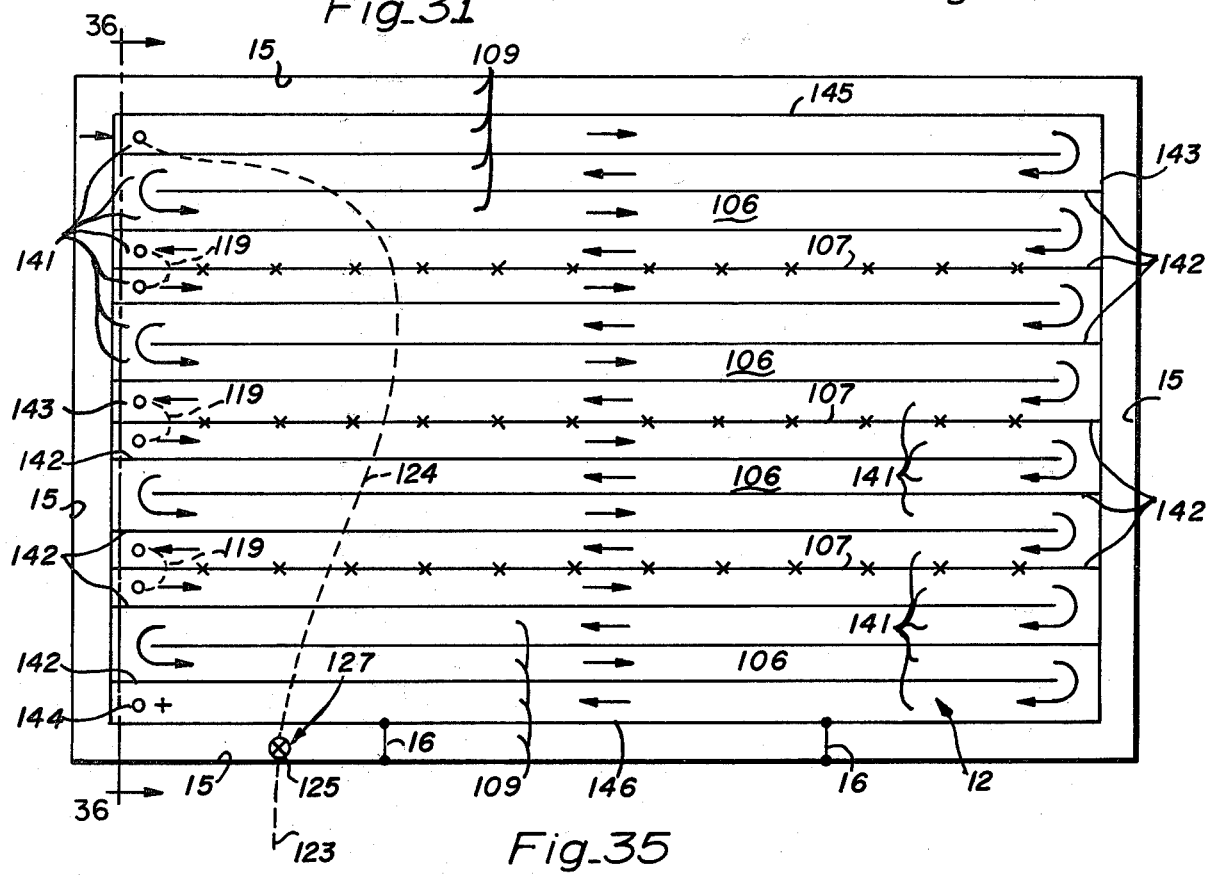
Fig_35
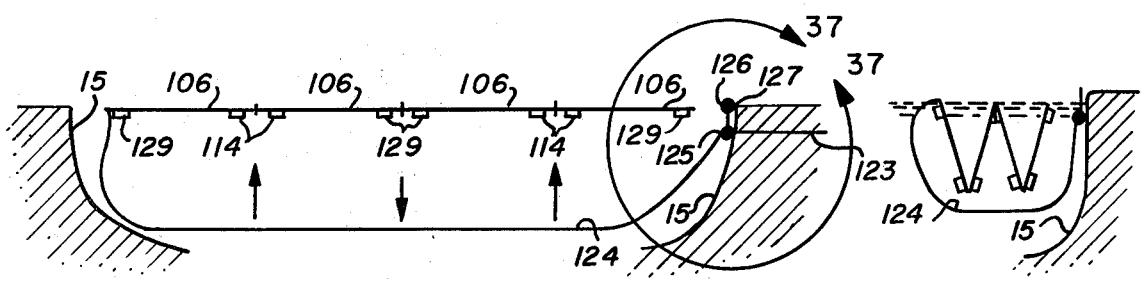
Fig_36  Fig_37

METHOD FOR MAKING A SWIMMING POOL COVER TEMPLATE

RELATED CASES

The present application is a continuation-in-part application of copending continuation-in-part application Ser. No. 734,349 filed Oct. 20, 1976 now abandoned, which inturn is a continuation-in-part application of copending divisional application Ser. No. 613,443 filed Sept. 15, 1975 of U.S. Pat. No. 3,927,427 issued Dec. 23, 1975 which was a continuation-in-part application of parent copending application U.S. Ser. No. 367,198 filed June 5, 1973, now abandoned.

DESCRIPTION OF THE PRIOR ART

Heretofore, buoyant thermally insulative pool covers have been proposed for covering a swimming pool and for retaining the heat within the pool. Such pool covers are disclosed in U.S. Pat. No. 3,683,428 issued Aug. 15, 1972; U.S. Pat. No. 3,405,410 issued Oct. 15, 1968; U.S. Pat. No. 3,528,110 issued Sept. 15, 1970; and U.S. Pat. No. 3,072,920 issued Jan. 15, 1963.

Some of these prior art covers use a rigid plastic foam such as polystyrene made up in a number of segments joined together along adjacent seams or laced together by means of flexible hinges.

Such prior covers, both of the rigid and flexible types, are very effective in retaining the heat within the pool. However, they are extremely clumsy and difficult to remove for opening the pool for swimming. Opening the pool for swimming requires that the individual segments in the case of a segmented cover be removed by hand and set aside on the pool bank. This is a relatively time consuming and tedious operation. It must be repeated each time the pool is to be used. Moreover the prior art floating covers extend substantially to the sidewall of the pool in such a manner as to prohibit use of a self-propelled automatic pool cleaning device such as the conventional pool sweep cleaner marketed by Arneson Products.

SUMMARY OF THE PRESENT INVENTION

The principal object of the present invention is the provision of an improved swimming pool cover.

In one feature of the present invention, sinking means are operatively coupled to the buoyant thermally insulative pool cover along at least one predetermined action line for selectively sinking, when actuated, at least a portion of the cover along the action line to cause the cover to be folded within the pool, thereby opening a region of the pool for swimming.

In another feature of the present invention, a cover sinking means which is coupled to the pool cover along certain predetermined action lines for folding the cover within the pool consists of an inflatable bladder coupled to a weight structure such that by inflation of the bladder the negative buoyancy of the weight can be overcome to cause the positive buoyancy of the cover to prevail, whereby the cover is retained in the fully extended position on the surface of the pool, but upon deflation of the bladder the negative buoyancy of the weights overcomes at least a portion of the positive buoyancy of the cover along certain predetermined action lines to cause the cover to be folded and retracted to one side for opening the pool for swimming.

In another feature of the present invention, the buoyant thermally insulative pool cover includes a part line extending lengthwise of the pool generally down the center thereof, sinking means are coupled to each half of the parted cover generally near the part line such that upon sinking of the marginal edge of the cover along the part line the cover is retracted toward the sides of the pool leaving a clear center lane for swimming.

In another feature of the present invention, the floating pool cover is tethered along one side and untethered along the other side with sinking means extending along certain action lines running longitudinally of the cover, such that upon actuation of the sinking means the cover tends to fold and to be retracted toward the tethered side edge of the cover, thereby opening a region of the pool for swimming.

In another feature of the present invention, spacer means are provided along the periphery of the cover for spacing the side edge of the floating cover from the side wall of the pool by an amount greater than 10 inches to permit a conventional self-propelled cleaning buoy to pass between the edge of the cover and the side wall of the pool, whereby the pool is automatically cleaned with the cover in place.

In another feature of the present invention, the buoyant thermally insulative cover is translucent such that the cover has a minimum detracting effect upon the asthetic appearance of the pool, particularly at night when the pool is lighted from within.

In another feature of the present invention a laterally extending inflatable and deflatable member is coupled to the cover to aid in extending the cover when inflated.

In another feature of the present invention, pool water is circulated over the pool cover or through channels of the pool cover to provide solar heating.

In another feature of the present invention, pool water is circulated over the top of the cover for cleaning thereof.

In another feature of the present invention, the lip of the cover contains additional positive buoyancy relative to the central region of the cover for providing additional support at the lip.

In another feature of the present invention, the negative buoyancy weights are preferably hollow to receive the inflatable bladders, whereby dimensioning of the bladders for neutral buoyancy is made less critical, the overall size of the negative buoyancy structure is decreased, and whereby the bladder is protected from inadvertent abrasion and damage.

In another feature of the present invention, air permeable structures are contained within the bladders to obtain more uniform inflation thereof.

In another feature of the present invention an inflatable spool is provided for handling a translucent sheet of material over the pool for making a template of the pool cover as an aid in fabrication of the pool cover.

In another feature of the present invention, the buoyancy of the swimming pool cover or a portion thereof is switched between positive and negative buoyancy by changing the ratio of the volume of air to the volume of water in a fluid fed through or to a conduit or container coupled to the cover for causing the cover to switch between a pool covering and a pool uncovering state.

In another feature of the present invention, the air in an air-water fluid mixture which is fed to the cover is introduced into the flow of water by means of an air injector, preferably a venturi serially connected with the flow of water to the cover. In one embodiment the air fed into the venturi is valved on and off for changing the volume of air injected into the flow of water for changing the air to water volume ratio of the air and water mixture fed to the cover.

In another feature of the present invention, the container or fluid conduit coupled to the pool cover for changing the buoyancy of at least a portion of the cover includes means for trapping the air in the conduit when the flow of an air containing fluid is stopped so that the cover is maintained in a pool covering state when the flow of an air rich fluid is stopped in the conduit or container.

In another feature of the present invention, the pool cover includes a solar heating region having a conduit portion through which pool water is circulated for heating, such solar heating conduit being arranged so that when an air containing fluid is fed therethrough the solar heating conduit provides a positive buoyancy for the cover, such positive buoyancy factor being controlled by varying the ratio of the volume of air to the volume of fluid in the air containing fluid mixture fed through the solar heating region of the pool cover.

In another feature of the present invention, the buoyancy changing conduit operatively associated with the cover is arranged in a serpentine path and the fluid is fed through the serpentine path in such a manner so as to enter at a region of the path remote from a portion of the serpentine path which is tethered to the pool so that jumbling of the cover in switching between the covering and uncovering state is prevented in the switching process.

Other features and advantages of the present invention will become apparent upon a perusal of the following specification taken in connection with the accompanying drawings wherein:

BRIEF DESCRIPTION OF THE DRAWINGS

FIG. 8 is an enlarged sectional view of a portion of the structure of FIG. 2 delineated by line 8—8, FIG. 9 is a foreshortened side elevational view of the structure of FIG. 8 taken along line 9—9 in the direction of the arrows, FIG. 10 is an enlarged sectional view of a portion of the structure of FIG. 1 taken along line 10—10 in the direction of the arrows, FIG. 11 is a plan view of a portion of the structure of FIG. 10 taken along line 11—11 in the direction of the arrows, FIG. 12 is an enlarged sectional view of a portion of the structure of FIG. 1 taken along line 12—12 in the direction of the arrows, FIG. 13 is a view similar to that of FIG. 12 depicting an alternative cover embodiment of the present invention, FIG. 14 is a view similar to that of FIGS. 12 and 13 depicting an alternative cover embodiment of the present invention, FIG. 15 is a view similar to that of FIGS. 12-14 depicting an alternative rigid foam cover embodiment of the present invention of the type used in FIG. 7, FIG. 16 is a transverse sectional view through a hinged joint in panels of the type utilized in FIGS. 15 and 7, FIG. 19 is an enlarged detail cross-sectional view of a portion of the structure of FIG. 2 delineated by line 19—19 and depicting a buoyant lip portion of the cover, as employed in an alternative embodiment of the present invention, FIG. 20 is a schematic line diagram of an inflatable bladder of the present invention, FIG. 21 is a plan view, partly in block diagram form, of a pool covered by the cover of FIG. 19, FIG. 22 is an enlarged sectional view of a portion of the structure of FIG. 21 taken along the line 22—22 in the direction of the arrows, FIG. 23 is an enlarged sectional view of a portion of the structure of FIG. 21 taken along line 23—23 in the direction of the arrows, FIG. 24 is a view similar to that of FIG. 8 depicting an alternative embodiment of the present invention, FIG. 25 is a longitudinal sectional view of a weight incorporating features of the present invention, FIG. 26 is a schematic plan view of a pool depicting a method for making a pool cover template incorporating features of the present invention, FIG. 27 is a plan view, partly in schematic block diagram form, of a swimming pool employing an alternative cover of the present invention, FIG. 28 is an enlarged laterally foreshortened sectional view of a portion of the structure of FIG. 27 taken along line 28—28 in the direction of the arrows, FIG. 29 is a transverse sectional view of a portion of the structure of FIG. 27 taken along line 29—29 in the direction of the arrows and showing the pool cover in the pool uncovering state or folded state, FIG. 30 is an enlarged sectional view of a portion of the structure of FIG. 27 taken along line 30—30 in the direction of the arrows, FIG. 31 is an enlarged sectional view of a portion of the structure of FIG. 27 taken along line 31—31 in the direction of the arrows, FIG. 32 is a sectional view of the structure of FIG. 31 taken along line 32—32 in the direction of the arrows, FIG. 33 is an enlarged sectional view of a portion of the structure of FIG. 27 taken along line 33—33 in the direction of the arrows, FIG. 34 is a view similar to that of FIG. 24 depicting an alternative weighting arrangement for the cover of the present invention, FIG. 35 is a plan view, partly in schematic line diagram form, of a pool cover incorporating alternative features of the present invention, FIG. 36 is a transverse sectional view of the structure of FIG. 35 taken along line 36—36 in the direction of the arrows, and FIG. 37 is a detailed view of a portion of the structure of FIG. 36 depicting the cover in the uncovering state.

DESCRIPTION OF THE PREFERRED EMBODIMENTS

Figure 1:
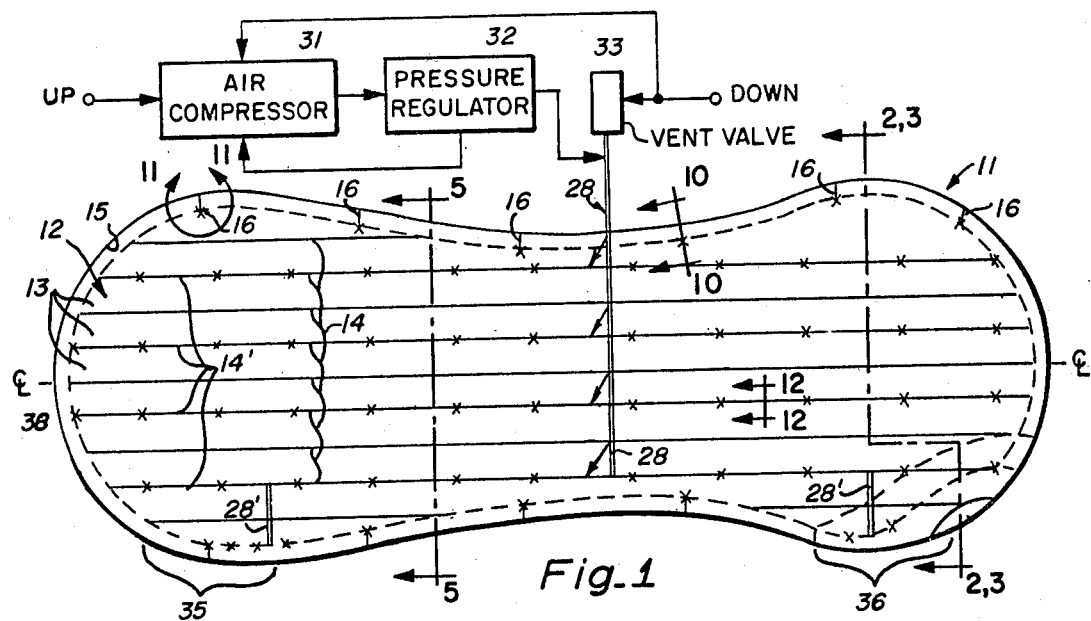
FIG. 1 is a plan view, partly in schematic block diagram form, of a swimming pool employing the cover of the present invention.

Referring now to FIG. 1, there is shown a free form shaped swimming pool 11 having a thermally insulative swimming pool cover 12 floating upon the surface thereof.

The swimming pool cover 12 has a net positive buoyancy in the extended position for covering the pool and may comprise any one of a number of different structures to be more fully disclosed below with regard to FIGS. 12–16. In one embodiment, the cover 12 comprises a plurality of elongated parallel panels 13 with adjacent ones of the panels 13 being joined together by means of hinge-type seams or joints 14.

In a preferred embodiment, the panels 13 terminate approximately 1 foot from the adjacent side edge 15 of the pool 11 such that a one-foot margin is provided around the entire perimeter of the cover 12. In this manner, a self-propelled pool cleaner such as the Arneson pool sweep may travel around the perimeter of the cover in the marginal space between the pool edge 15 and the adjacent edge of the floating panel 13.

The swimming pool cover 12 is tethered to one side edge 15 of the pool 11 via the intermediary of a plurality of arch shaped resilient spacer members 16, more fully described below with regard to FIGS. 10 and 11. These spacer members 16 are joined at one end to the panels 13 and at the other end to the lip of the pool in order to provide the proper spacing from the edge of the pool to the panels 13 and to prevent longitudinal or lateral translation of the pool cover 12 relative to the side wall 15 of the pool in order to maintain the marginal clearance for the pool sweep.

Figure 2:
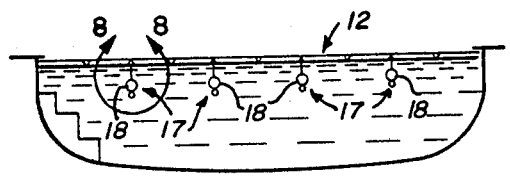
FIG. 2 is a sectional view of the structure of FIG. 1 taken along line 2—2 in the direction of the arrows with the pool cover in the extended position.

Alternate ones of the hinge joints 14' between adjacent panels 13, as indicated by the "X" marks along the hinge lines 14', are coupled to sinking means 17 as shown in FIGS. 2, 8 and 9. The sinking means comprise a tubular inflatable bladder portion 18 with a dependent weight portion 19. The weight portion 19 includes a suitable ballast material 21, as of portland cement, sand, gravel, or the like, chosen to provide a predetermined negative buoyancy for sinking a certain predetermined portion of the pool cover 12. In a preferred embodiment, the ballast 21 comprises a plurality of concrete cylinders 22 each being approximately 1 foot in length and provided with rubber or plastic end caps 23 to prevent scarring, denting or scraping of the bottom or sides of the pool. The cylinders 22 are retained within loop portions 24 dependent from the bladder 18. The bladder 18 is dimensioned to provide a sufficient positive buoyancy taken together with the positive buoyancy of the certain portions of the cover 12 to overcome the negative buoyancy of the weight 21 when the bladder is inflated with air.

The sinking structure is affixed to the hinge 14' as by adhesive, heat sealing, stitching or the like. An upper flange portion 25 of the bladder is affixed to the underside of the hinge portion 14'. In a typical example, the bladder 18 is made of 0.020" thick clear polyvinyl-chloride plastic. The bladder 18 is readily fabricated by folding a sheet of plastic over on itself and forming two longitudinal seams 26 and 27 to define the inflatable bladder 18 and the dependent loop portions 24, the latter being formed by slicing the lower tube portion between seam 27 and the fold. The ends of the tube 18 are closed as by heat sealing or RF sealing such that an airtight structure is obtained.

Referring again to FIG. 1, the bladders 18 are inflated and deflated by means of tubulation 28 connected into each of the bladders 18 via suitable gastight fittings 29. Air for inflating the bladders 18 is derived from an air compressor 31 via a pressure regulator 32 set for a suitable maximum pressure as of +5 PSI. A solenoid operated vent valve 33 is connected to line 28.

In operation, the cover 12 is positioned in its extended (covering state) by actuation of the air compressor 31 by means of an up command, such as by switching an electrical switch for supplying electrical energy to the compressor. The air compressor 31 supplies air at a suitable pressure as of 5 PSI to each of the inflation bladders 18 such that the negative buoyancy of the weight structure 19 is overcome and the positive buoyancy of the cover 12 prevails to allow the cover 12 to float on the surface of the pool. When it is desired to uncover the pool, an electrical switch is thrown that actuates the solenoid valve 33 to open the valve and to vent the tubulation 28 to the atmosphere. The down command also switches off the air compressor 31.

Figure 3:
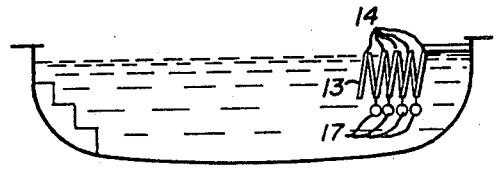
FIG. 3 is a view similar to that of FIG. 2 showing the pool cover in the collapsed or retracted state for uncovering a region of the pool for swimming.

As the air escapes from the bladders 18 and they deflate, the negative buoyancy of the ballast 21 takes over and causes the cover 12 to partially sink along action or fold lines 14'. Due to the fact that the cover 12 is tethered along one side edge of the pool and untethered at the opposite side edge and along the ends, the cover 12 tends to fold and to be retracted toward the tethered side of the pool as shown in FIG. 3. This serves to uncover a substantial region of the pool extending for the full length of the pool for swimming.

The negative buoyancy required for the sinking structure 17 is only that required to overcome the positive buoyancy of portions of the panels 13 disposed on adjacent sides of the action line 14'. This negative buoyancy need not overcome the entire positive buoyancy of the panels 12 on opposite sides of the respective action line 14' as, in a preferred embodiment, a portion of the cover 12, namely, the intervening hinge lines 14, remains on or slightly above the surface of the pool.

In the particular pool shown in FIG. 1, due to the outwardly bulging portions of the pool and thus the cover 12 in regions 35 and 36, auxiliary sinking means are provided essentially at the marginal edge of the cover 12 in regions 35 and 36 for sinking these outwardly extending portions of the cover 12. These auxiliary sinking means, of the same type as used elsewhere in the cover 12, have their bladders 18 connected in gas communication with the main tubulation 28 via the longitudinally directed bladder 18 and lateral auxiliary sections of tubulation 28'.

Tubulation 28 and 28' is preferably flexible and relatively large in diameter as of 2–3 inches and extends laterally of the cover 12 below the surface of the cover 12. The lateral tubing 28 is fixedly secured to each of the longitudinal bladders 18 such that the lateral tubing when inflated serves as a ram for laterally extending the cover 12 over the surface of the pool. The lateral tubing 28 and 28' is preferably weighted to sink when deflated such as not to be caught in the folds of the cover 12. That portion of tubulating 28 extending between the air compressor and pool edge need not be as large in diameter, as of ½ to 1", and may actually comprise a pressurized vacuum line often provided between the pool equipment pad and the pool.

Figure 4:
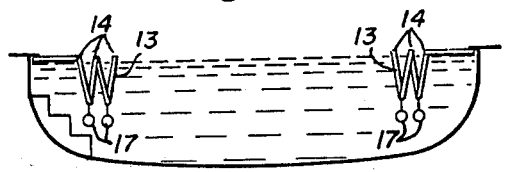
FIG. 4 is a view similar to that of FIG. 3 depicting an alternative embodiment of the present invention.

Referring now to FIG. 4, there is shown an alternative embodiment of the cover 12 of FIG. 1 wherein the cover is provided with a longitudinal center part line 38 such that the cover 12 is divided into two halves. In this case the actuating tubulation 28 would include one length laterally connected into the bladders or bladder of one half of the cover 12 and a second branch of the tubulation, which would extend around the lip of the pool underneath the overhang is connected in gas communication with the bladder or bladders 18 of the second half of the cover 12. The cover 12 in the extended position appears as shown in FIG. 2 and in the open state appears as shown in FIG. 4 wherein each half of the cover is retracted toward its respective side wall. In this case, the cover 12 is also tethered along both side walls.

Figure 5:
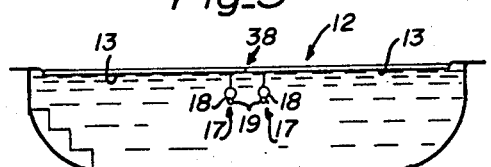
FIG. 5 is a transverse sectional view of the pool of FIG. 1 taken along line 5—5 in the direction of the arrows and depicting an alternative embodiment of the present invention with the pool cover in the extended position.
Figure 6:
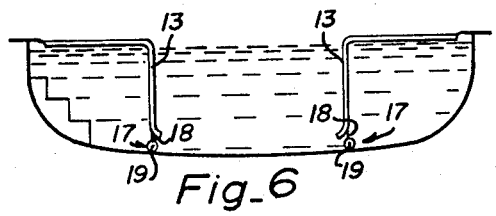
FIG. 6 is a view similar to that of FIG. 5 depicting the cover in the retracted or folded state for opening a central region of the pool for swimming.

Referring now to FIGS. 5 and 6 there is shown an alternative embodiment of the present invention. In the embodiment of FIGS. 5 and 6, the swimming pool cover 12 includes the longitudinally directed center part line 38 dividing the cover 12 into two halves. The sinking means 17 includes two sinking structures extending longitudinally of the pool cover 12 adjacent to and parallel to the part line 38, except at the shallow end of the pool the sinking structures may, if desired, diverge for folding the cover in the shallow end in a manner similar to that shown in FIG. 4. When the bladder portion 18 of the sinking means structure 17 is fully inflated to overcome the negative buoyancy of the ballast portion 19, the cover is in the fully extended position as shown in FIG. 5. When the bladders 18 are deflated the negative buoyancy of the ballast takes over to fold under so much of the panels 13 as determined by the amounts of negative ballast. In the shallow end of the pool it is desired to uncover a lane wider than approximately 6 feet, the sinking means 17 can move away from the parting line 38 toward the respective adjacent side walls of the pool by an amount equal to approximately the depth of the shallow end of the pool such that the width of the lane opened up would be approximately equal to four times the depth of the pool. In the case of a three-foot depth at the shallow end, this would correspond to a swimming lane width of 12 feet. Auxiliary lateral part lines with corresponding lateral sinking means can be provided for uncovering steps, ladders and the like.

Figure 7:
FIG. 7 is a view similar to that of FIG. 6 depicting an alternative embodiment of the present invention wherein the pool cover is made of rigid foam panels and depicting the cover in the retracted state for uncovering a region of the pool for swimming.

Referring now to FIG. 7, there is shown an alternative embodiment of the present invention wherein the pool cover 12 is formed of rigid panels 13, as of polystyrene plastic foam. In this embodiment the negative ballast 19 of the sinking means 17 needs only to be sufficient to sink a portion of the plastic foam panels 13. As the negative ballast takes over upon deflation of the bladders 18, the hinged panels 13 tilt up as shown in FIG. 7 and the structure folds toward the tethered edge of the pool cover 12. Use of the rigid plastic foam panels 13 as shown in FIG. 7 is not limited to the case where the cover 12 is tethered along only one side. As an alternative the rigid panels may be utilized in the embodiment as shown in FIG. 4 where a part line is provided centrally of the pool and the two halves of the cover are retracted toward opposite sides of the pool.

Referring now to FIGS. 10 and 11 there is shown, in greater detail, the tethering structure 16 for tethering the cover 13 to the side edge of the pool. More particularly, the tethering structure 16 comprises a resilient arched member 16, as of rubber or plastic, which is joined at one end as by adhesive to the underside of the cantilevered deck at 41 and similarly joined to the edge of one of the panels 13 of the pool cover 12 for spacing the cover from the side wall of the pool by an amount sufficient to allow the self-propelled pool cleaning device to circulate around the perimeter of the cover 12. The conventional buoy 42 of the pool cleaning device requires more than 10 inches of clearance between the edge of the cover and the side wall of the pool. A thermally insulative flap 43 is sealed to the cover 13 and is supported upon the arch shaped members 16 for closing off the region between the lip of the pool and the marginal lip of the adjacent panel 13. In the untethered marginal region of the cover 13, the resilient arch shaped members 16 are provided but they are not sealed to the lip of the pool structure however they do serve as arch shaped supports for the marginal flap portion 43 and as spacers for the marginal edges of the panels 13. In some embodiments the cover 12, at the margin, may be of sufficient light weight to allow the pool sweep to pass thereunder by the self-propelled buoy 42 lifting of the cover or flap portion of the cover.

Referring now to FIG. 12, there is shown, in cross section a preferred panel structure 13 of the present invention. In the panel 13 of FIG. 12, the panel is flexible and comprises a strip of plastic bubbles 44 captured in a plastic sheet, as of polyethylene. In a typical example the bubbles 44 are ½ of an inch in diameter and ⅜ of an inch in height and are provided in a closely packed array in a plastic sheet captured between a pair of clear vinyl sheets 45, as of 0.010 inch thick clear ultra violet resistant polyvinyl-chloride sheet material. The vinyl sheets 45 are sealed together as by RF, sealing at the periphery of the panels 13 to provide transparent envelopes for each of the panel sections 13. Adjacent panel sections 13 are sealed together at their mating flange portions to provide the action hinge 14'. The inflatable bladder 18 with dependent ballast 19 is affixed to the underside of the hinged portion 14 as by a suitable adhesive or RF sealing.

The captured bubbles 44 serve to space the two sheets 45 and to provide buoyancy for the panels 13. In addition the air cap or bubble material 44 is translucent and made of a clear material such that a substantial amount of the sun's energy may pass through the panel 13 into the pool for absorption therein to provide solar heating of the pool during the daylight hours. Moreover, the translucent and near transparent appearance of the panels 13 of FIG. 12 provides a minimum of disturbance to the asthetic appearance of the pool. This is particularly true at night with the pool lighted from within.

Referring now to FIG. 13 there is shown an alternative panel structure 13 of the present invention. More particularly, in the embodiment of FIG. 13, the pool cover 12 is formed by a pair of clear polyvinyl-chloride sheets 46 as of 0.010 inch thick clear polyvinyl-chloride sealed together as by RF sealing techniques in a grid or waffle configuration defining a multiplicity of air pockets as of 3 to 18" on a side in the composite panels 13. The advantage to the quilted or waffle cover structure of FIG. 13 is that it is nearly totally transparent to the sun's rays in the visible range while providing substantial thermal insulation.

Referring now to FIG. 14, there is shown an alternative flexible pool cover panel structure 13. More particularly, in the pool cover panel structure of FIG. 14, each panel is formed of a flexible plastic foam sheet 47 which may be of the open cell or closed cell foam type captured between two sheets of polyvinyl-chloride material, as of 0.010 inch thickness and preferably colored light blue. The sheets 48 are sealed at the periphery of the foam member 47. In a typical example the flexible foam 47 has a thickness as of 0.250 to 0.750 inches. In the case where the flexible foam 47 is of the open cell type the envelope 48 may be filled with water to reduce the buoyancy of the panels 13 thereby reducing the requirements on the size of the ballast 19 and the size of the bladder 18. The water trapped in the open cell foam 47 has only negligible influence on the thermal insulative properties of the foam 47 since the water is trapped in the foam structure.

Referring now to FIGS. 15 and 16 there is shown an alternative panel structure of the present invention wherein the panels 13 are made of a rigid foam material, as of polystyrene. The bladder portion 18 of the sinking structure 17 is joined along the active hinge line 14' by being secured along the top of adjacent side edges of panel 13. In a typical example, the bladder includes a vertical flange portion 49 which passes in between adjacent rigid panels 13 and terminates in a cross flange portion 51 secured to the top of the adjacent panels 13 via adhesive at 52. When the bladder 18 is deflated the downward force at the hinge joint 14 causes the adjacent panels to tilt upwardly. The pliable flange portion 51 bends back on itself allowing the adjacent panels 13 to tilt. The non-active hinge joints for the rigid panels 13 is shown in FIG. 16 and comprises a pliable sheet 53 cemented over the crack 54 between adjacent rigid panels 13. A cover flange or seal 55 is secured to one of the panels 13 and has a free lip portion 56 extending over the crack 54 and the marginal edge of the adjoining panel 13 to prevent debris from collecting in the joint 54 between the adjacent panels 13. The hinge joint 14, formed in the structure of FIG. 16, allows the rigid panel to fold in the opposite sense to the active joint 14' shown in FIG. 15.

Figure 17:
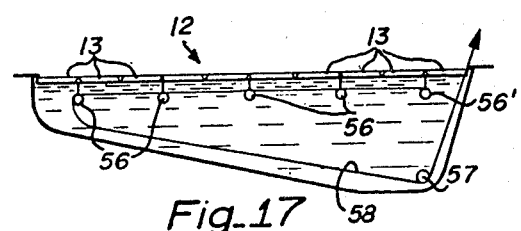
FIG. 17 is a longitudinal sectional view of a swimming pool cover with an alternative mechanical structure for retracting the cover.
Figure 18:
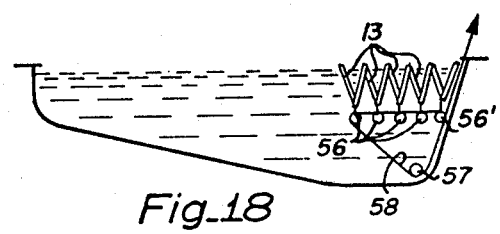
FIG. 18 is a view similar to that of FIG. 17 depicting the cover in the partially retracted state.

As thus far described, pneumatic means have been provided for folding and unfolding the cover structure 12 to open and close the swimming region of the covered pool. While the pneumatic actuating means comprises the preferred embodiment, it is also possible to substitute a mechanical sinking means for the pneumatic sinking means. More particularly, as shown in FIGS. 17 and 18, the cover 12 may comprise a plurality of laterally directed panels 13 joined together by laterally directed hinges. The panels 13 may be rigid or flexible. A plurality of pulleys 56 are connected to alternate lateral hinge joints 14' via a suitable bridle. A pulley 57 is affixed near the bottom of the pool in the deep end thereof and a line 58 is affixed to the end pulley 56. The line 58 passes over the top of the remaining pulleys 56 and around the bottom of the submerged pulley 57 to a takeup means such as a winch, not shown, on the pool deck. The operator actuates the winch to takeup on line 58 causing the active hinge joints 14' affixed to the pulleys 56 via the bridles to be submerged as shown in FIG. 18 for retracting and folding the cover 12 within the pool to clear a region for swimming.

The advantage of the pool cover 12 of the present invention is that it provides a truly effective and efficient thermally insulative cover for the pool for retaining the heat within the pool when the pool is not in use. At the same time in certain embodiments utilizing transparent or translucent thermally insulative covers the asthetic appearance of the pool is retained. The cover does not unduly interfere with normal pool cleaning devices such that that debris which does enter the pool can be cleaned in the conventional manner. At the same time an automatic system is provided for opening and closing a substantial region of the pool for swimming. The pool cover is readily removed in the summer, if desired, by detaching the ballast and then folding the cover for storage. In this regard, the spacing member 16 which is employed for tethering the edge of the cover to the pool may be detachably secured to the lip of the pool, as by screws passing into members more permanently affixed to the lip of the pool as by adhesive.

In the case of rigid panels 13 in a non-rectangular pool, the end portions of the panels 13 are preferably made of a flexible panel portion, as of flexible plastic foam, to enable the flexible end portions to deform to the curved contour of the pool edge at the opposite ends of the pool as the folded panels are laterally retracted against the lateral sides of the pool.

Also, the lateral extending inflation and deflation tubulation need not be separate from the bladders 18 but in a preferred embodiment, tubulation 28 connects into the bladder 18 nearest the side of the pool at any convenient point such as midway along the length thereof. Additional short lateral tubular segments are provided interconnecting adjacent bladder 18 at the shallow end of the pool such that debris caught on the top of the cover 12 is dumped toward the deep end of the pool where it is most easily collected by the main drain. This dumping action takes place because the cover 12 sinks first and raises last at the end of the cover 12 which is most remote from the inflation and deflation tubulation 28.

Referring now to FIG. 19, there is shown an alternative embodiment of the present invention. In this embodiment, additional positive buoyancy is provided at the lip of the cover 12 by providing a hollow tubular channel 61 at the lip of the cover 12, such channel including an inflatable bladder 62 extending around the periphery of the cover at the lip thereof. Inflation of the bladder 62, as derived from the air compressor or air pump 31 and line 28, serves to inflate the bladder 62 when the cover 12 is to be extended for covering the pool. In addition, inflation of the bladder 62 serves to force the outer lip portion of the cover 12 up against the wall of the pool to aid in sealing the cover to the pool. The additional positive buoyancy at the lip is provided so that an object or a person falling upon or otherwise tending to depress the lip of the cover 12 is more fully supported to prevent such object or person from falling beneath the cover at the lip thereof. The bladder 62 and the hollow channel lip portion 61 preferably extend substantially entirely around the periphery of the cover except in that region which would be adjacent the skimmer 63 (see FIG. 21) so that a flow of pool water into the skimmer 63 over the top of the cover is facilitated.

In addition, the channel portion 61 at the lip of the cover 13 may include an array of openings 64 communicating with a pool water distribution manifold 65 provided on the inside of the hollow lip 61 and formed by sealing a sheet of plastic 66 to the inside wall of the channel 61 along opposite marginal side edges of the array of openings 64. A pool water conduit 67, preferably connected to the output of the pool water circulation pump 86, filter 87, and heater 89, serves when actuated via a valve 68 to return the pool water over the top of the cover 12 so as to flush dirt and debris collected on the upper surface of the cover into the skimmer 63. Valve 68 is solenoid operated from a timer inside the controller 84 so that the top of the cover is flushed during a certain predetermined portion of the day or night.

When the cover 12 is being flushed with pool water, the water level on top of the cover 12 can build up to a substantial depth because the inflated lip 61 provides an overall positive buoyancy for the cover. The cover is preferably weighted or otherwise arranged so that the cover 12 slopes toward the skimmer drain 63 so that the flushing water flows to the skimmer. The lowest or more heavily weighted portion of the cover is adjacent the skimmer to provide the lowest portion thereof. The weighting of the cover to provide the flow path to the skimmer 63 is shown in FIG. 22.

An air or gas permeable structure such as a wire helix 71 is contained within and is substantially axially coextensive of the bladder 62 to prevent the bladder 62 from being fully collapsed when deflated and sunk below the water level of the pool as occurs during folding of the cover 12. The helix is preferably terminated at one end on a "T" fitting 72 utilized to feed the air into the bladder 62, as shown in FIG. 20, so that the inside of the helix is in good gas communication with the "T" fitting 72.

The bladders 62 are conveniently secured to the "T" fitting 72 via hose clamps 73 which bear on a flexible collar 74, as of fiber-reinforced rubber, which in-turn serves to clamp the open end of the bladder 62 around the transverse end portion of the "T" fitting 72 to form a fluid-tight seal thereto. Air is pumped to and from the bladder 62 via a reversible air pump 31 for inflating and deflating the bladders 62. This same arrangement is employed for inflating and deflating bladders 18 of the previous embodiments.

In an alternative embodiment, which does not have to be partially sunk, the lip portion of increased positive buoyancy merely comprises a solid foam cylindrical member extending around the lip of the cover 12 and being secured thereto.

Referring now to FIGS. 21–23 there is shown a solar heating embodiment of the pool cover of the present invention. In the embodiment of FIGS. 21 and 22 the buoyant pool cover material 12 which, in a preferred embodiment may comprise two-pound per cubic foot polyethylene foam within the range of thickness of ⅛" to ¾" and preferably ¼" in thickness. Also the buoyant cover material 12 may comprise a sheet of expanded foam rubber such as Hypalon rubber which is particularly resistant to damage by ultraviolet radiation. Also, in the case of polyethylene and other plastics, the foam plastic material preferably includes UV inhibitors or is coated with a UV inhibited material such as Hypalon rubber or liquid urethane rubber.

In one embodiment of the combined solar heater and pool cover, the top surface of the pool cover foam material 12 includes a cover sheet 74 which is sealed to the upper surface of the plastic foam 12, as by heat sealing, along certain seam lines 75 to define a plurality of generally parallel pool water passageways 76 through which the pool water is circulated for solar heating thereof. In one embodiment, the plastic sheet 74 is made of a solar energy translucent material so that the solar energy passes through the cover sheet 74 into the pool liquid stream. Solar energy which is not absorbed directly in the pool water stream is absorbed by the upper surface of the plastic foam sheet 12 for conversion into thermal energy which is in thermal exchanging relation with the pool water circulating therethrough for heating thereof.

An input water distribution manifold 77 is conveniently formed at the upstream end of the solar heating channels 76 by sealing a sheet of plastic 78 along marginal side lip portions 79 to the underside of the plastic foam sheet 12 on opposite sides of an array of water distribution holes 81 communicating through the plastic foam sheet 12 to the channels 76 on the upper side thereof. As an alternative, pool water is brought into a similar manifold formed by heat sealing of the cover sheet 74 on top of the cover 12, in which case the holes 81 are eliminated.

Pool water is brought into the manifold 77 via input line 82. The circulation of pool water through line 82 is controlled via a valve 83 operatively connected to an output of a controller and solar heat sensor 84 which senses when the solar heating conditions are proper for solar heating and opens the valve 83 and closes the return valve 86 so that a substantial portion of the return pool water is circulated through the solar heating panel. At the downstream end of the solar heating channel 76, an array of openings 85 communicate with the channels 76 through the foam cover 12 to the pool below the cover. Water to be circulated through the solar heater can be picked up at the skimmer 63 or from the main drain and pumped via the pool circulation pump 86, filter 87, and pool heater 88 to pool return lines 67, 82 and 89 in accordance with the setting of valves 68 and 83.

Weights 91, as of concrete, are carried in pockets 92 formed in the bottom side of the buoyant cover 12 by being captured within a saddle 93, as of sheet plastic, sealed to the bottom of the cover 12 along marginal side lip portions. The weights 91 serve to load the cover with a certain degree of negative buoyancy to cause the cover to slope toward the skimmer 63 for causing a flow or stream of pool water pumped over the top of the cover to flow toward the skimmer for cleaning of the pool cover in use.

The sheet of plastic or other material serving as the cover for the water channels 76, in one embodiment, is made of a solar energy translucent material, such as clear polyethylene or clear polyvinylchloride, and the upper surface of the foam cover layer 12 at 94 is preferably coated with a solar energy absorbing layer, as of dark blue or black Hypalon rubber, so that the radiant energy passes through the translucent cover or window portion 74 into the water channels 76 and to the dark layer 94.

In an alternative embodiment, the cover layer 74 is made of a dark solar energy absorbing material, as of Hypalon rubber or of black plastic such as polyethylene or polyvinylchloride, such that the solar radiant energy is absorbed in the layer 74 and the thermal energy is transferred therethrough to the coolant channels 76. In this latter embodiment, the plastic sheet material 74 is preferably made of a UV resistant material. One advantage of this latter embodiment is that it serves to protect the foam cover 12 from UV damage.

Referring now to FIG. 24 there is shown an alternative negative buoyancy weight embodiment of the present invention. A hollow cylindrical weight 97, as of concrete, is carried within a saddle 98 formed by a channel of plastic material, as of polyethylene foam or polyethylene or polyvinylchloride sheet, which is sealed along a fold line 14' to the bottom side of the foam cover 12 at 99. The saddle 98 is transversely segmented at approximately one foot intervals with one inch spacing therebetween along the length thereof to accommodate approximately one foot lengths of the hollow cylindrical weight 97.

The inside to outside diameter of the hollow weight 97 is dimensioned so that annular concrete portion of the weight provides sufficient negative buoyancy per linear foot for sinking the required number of square feet of the cover 12 to be sunk by the individual weight. However, the ratio of the inside to outside diameter of the hollow cylindrical weight 97 is chosen so that when the hollow interior of the weight is fully occupied by the inflated bladder 62 the positive buoyancy of the bladder 62 will overcome the negative buoyancy of the weight 97 to provide substantial total neutral buoyancy for the weight 97 including the saddle 98 if such saddle has positive buoyancy. In a typical example, assuming the concrete has a density of 129 pounds per cubic foot and that the water has a density of approximately 65 pounds per cubic foot and neglecting the positive buoyancy, if any, of the saddle the outside radius $r_o$ of the weight 97 is equal to 1.414 times the inside radius $r_i$. In addition, the negative buoyancy of the weight in pounds is equal to the inside radius $r_i$ squared times 1.416 where the inside radius $r_i$ is in inches. Concrete having a composition by volume of two parts concrete powder to two parts fine sand to one part water has a density of approximately 129 pounds per cubic foot.

In case the positive buoyancy provided by the bladder 62 is slightly in excess of that to achieve neutral buoyancy, the neutral buoyancy may be trimmed by reducing the positive buoyancy of the inflated bladder 62 by inserting an open ended trim tube 101 into the hollow interior of the weight for displacing a portion of the bladder 62. If the weight 97 is excessive and sinks too much of the cover material, the amount of the weight can be reduced by forming the weight with annular notches 102 on the interior or exterior thereof at convenient intervals of length as of one to two inch axial spacing. A selected portion of the weight may be broken off from the main body of the weight by fracturing the weight in registration with a selected one of the notches 102.

Referring now to FIG. 26 there is shown a method for making a template to the precise shape of the pool to be covered. More particularly, a thin translucent film 104 and preferably transparent, as of 0.0003–0.003 inch thick polyethylene film is first rolled onto an inflated spool 105 provided by inflation of a tubular plastic member as of 0.010 inch thick polyvinylchloride sheet material formed by heat sealing into a tubular shape. The inflated spool 105, after the translucent film is wound thereon, is deflated for easy folding and storage. When it is desired to roll out the translucent film, which is to form the template, over the pool, the deflated spool 105 is inflated and disposed across the pool. As the spool 105 is rolled across the pool for unrolling the translucent film, weights 103, such as water filled sections of 0.006 inch thick five inch diameter plastic tubing, are laid out for weighting the edge of the film 104 for holding same in the desired position. After the film 104 has been positioned and tightened over the pool, the border of the pool is marked on the translucent film by means of an indelible marking pen. In addition, other items of interest are marked on the film such as the location of the skimmer, inlet and outlet pipes and depth of the pool at the shallow end including such things as stairs, etc.

After marking of the translucent template 104, the film is again wound back on the inflated spool 105, deflated and sent to a site for fabrication of the pool cover. While the translucent film is being unrolled over the surface of the pool it is often desirable to feed a stream of air in under the film to prevent the film from sagging into the water of the pool where surface tension can deleteriously affect proper handling of the template.

Referring now to FIG. 27 there is shown an alternative pool cover 12 incorporating features of the present invention. More particularly, cover 12 includes a plurality of elongated pool cover panels 106 hinged together at hinges 14 via hinge members 107. In a preferred embodiment the pool cover panels 106 are partitioned by means of an array of longitudinally directed laterally spaced web members 108 into a multitude of parallel channels or conduits 109.

In a typical example, the panel 106 is an extruded plastic member wherein the top and bottom walls 110 and 111, together with the webs 108 are formed at one time in the extruding process. In a typical example, the panel 106 has a thickness, as of ¼", and the channels 109 occupy a volume of approximately 50 to 60% of the volume of a given cover panel 106. The plastic used for extruding the panel 106 is preferably a material compatible for use in the sun as a solar energy receiving panel and which is inert to the various chemicals utilized in the swimming pool, such as chlorine, acid, soda and the like. Similar panels 106 are conventionally utilized as solar energy collectors for use with swimming pools, such panels being marketed by FAFCO, Inc. of 138 Jefferson Drive, Menlo Park, Calif. and made of polypropylene. The panels 106 have a width of two to three feet and a length of eight to ten feet and the panel sections 106 are extended in length by means of a coupler 112, shown in greater detail in FIG. 33. The coupler 112 plugs into opposite ends of adjacent panels to be coupled and is sealed thereto in a gas and liquid tight manner by a suitable adhesive or cement.

In one embodiment, the plastic used for the panel 106 has a density approximately equal to that of water so that the panel per se has near neutral buoyancy. In a preferred embodiment the plastic which is utilized has a density slightly greater than water such that the panel per se has a net negative buoyancy.

The hinge joints 107 are formed by a flexible plastic material, as of polyvinylchloride, the plastic material being in sheet form and adjoined to adjacent lip portions 113 of adjacent panels 106. In one example, the hinge member 107 is fixed to the lips 113 as by a suitable adhesive or by an array of resilient fastener means extending along the opposite marginal edges of the hinge 107 and projecting through, in the manner as a rivet aligned apertures in the lip portions 113 of the adjacent panels 106.

In one embodiment, the panels 106 are of relatively rigid construction. In case that the panels 106 have a net positive buoyancy or near neutral buoyancy, sinking means 17 such as slab of concrete 114 is affixed to the panel 106 as by a suitable adhesive 115 at the interface of the weight 114 and the underside of the cover panel 106. The weight 114 may be placed in the center of the panel 106 if it is of relatively rigid construction. Otherwise, it is placed along the marginal edge which is to sink for folding.

A fluid manifold 116 (see FIGS. 31 and 32) serves to couple ends of adjacent panels 106. The manifold 116 plugs into the ends of two panels 106 to be joined together and provides fluid communication with each of the channels 109 of the adjacent panels 106. A main lateral manifold channel 117 is provided in the manifold 116, such channel 117 extending laterally of the joined panels 106. The laterally extending manifold chamber 117 communicates with each of the channels 109 via an array of apertures 118 communicating between the lateral channel 117 and each of the channels 109. The lateral channel 117 terminates at or near the lateral edge of each of the panels 106.

Adjacent manifold sections 116 are coupled together by means of U-shaped flexible hose portions 119, extending generally in the plane of the cover when in the pool covering state and, interconnecting adjacent ends of the adjacent manifold sections 116. Each hose portion 119 crosses over the hinge joint 14 between adjacent panels 106. The manifold 116 includes a longitudinally directed septum 121 serving as a stregthening member for the manifold. One of the manifold members 116 includes a water inlet port 122 for providing an inlet to the plurality of interconnected manifold members 116, such port 122 being connected to the pool return line 123 via a flexible hose 124.

As an alternative to manifold 116 the manifold may comprise a U-shaped cross section channel extending laterally of and generally in the center of each panel 106, the channel communicating with each channel 109 via holes provided in the bottom wall 111 of the panel 106 in registration with each channel.

In use, water is drawn from the pool 11 via a skimmer or main drain and pumped via pump 86 through a filter 87 and heater 88 to the pool return line 123 and thence into the manifold 116 via flexible hose 124. A venturi 125 is provided in the pool return line 123 either at the pool equipment pad or in the pool where connection is made between the hose 124 and the pool return line 123. The venturi 125 includes an air inlet pipe 126 connected into the low pressure point in the venturi for drawing air through the air intake pipe 126 and into the pool return line 123. A valve 127 is connected to the air intake line 126 for controlling the air injected into the pool return line 123 via the venturi 125. A timer or manual control 128 controls the position of the valve 127.

When the pool cover 12 is to be in the pool covering state, air is injected into the pool return water via the venturi 125. In a typical example, the air injected will comprise approximately 30% by volume of the air-water mixture fed to the pool cover via the pool return line 123. The air and water mixture is thence fed through the manifold 116 into the channels 109 of the individual pool cover panels 106.

The weights 114 are proportioned relative to the density of the panel 106 such that when the air and water mixture is fed through the channels 109, such mixture having an air rich composition, i.e., air is being injected via the venturi 125 and the volume of air in the air-water mixture is substantial, i.e., 10 to 50%, the cover panels 106 will have a net positive buoyancy and will float on the surface of the pool. The air-water mixture passes through the channels 109 and is returned to the pool via a collector manifold 128 (see FIG. 30) which collects the fluid passing through each of the channels 109 and exhausts the fluid below the water level in the channels 109 when the cover is floating on the surface of the pool.

In a preferred embodiment, the density of the plastic material making up the panel 106 has a density slightly greater than that of water so that in the absence of the air in the air-water mixture the panel would sink. In such case, the manifold 116 is arranged such that the channels 109′ which are adjacent the hinge 14 which is to remain on the surface of the pool are blocked by the absence of holes 118 so that air is trapped in channels 109′, for example, 10% of the channels 109 in a given panel. When the flow of the air-water mixture is terminated, for example, in the evening, the air which had been entrained in the air and water mixture remains in the channels 109 and the cover remains afloat.

To cause the cover 12 to switch into the uncovering state, the air intake pipe 126 is valved off via the timer 128 or by manual control and pool water is circulated through the panels 106 as aforedescribed. In this process the air that had previously been trapped or entrained in the channels 109 is swept from the channels 109 and the air is exhausted through the exhaust manifold 128. After the air has been swept from the channels 109 which are in communication with the pool return line 123, the positive buoyancy associated with the entrained air is removed permitting the negative buoyancy of a portion of the cover to take effect and to sink portions of the cover as shown in FIG. 29. The buoyant section of the cover corresponding to channels 109′ remains at the surface. As an alternative to the provision of the air-filled channels 109′ all the channels 109 may be placed in fluid communication with the pool water return line 123 and sections of plastic foam 129 affixed, as by adhesive, to the marginal edge portions of the adjacent panels 106 which are to remain at the surface (see FIG. 29). The buoyancy of the cover panels 106 is arranged so that approximately 10% of the respective panel remains above the surface of the water as shown in FIG. 29, when the cover 12 is in the pool uncovering state.

When it is desired to switch the cover to the pool covering state, the air valve 127 is opened permitting the venturi 125 to inject air into the pool return water. The pool pump is then turned on and the air rich air-water mixture is thence fed via the pool return line 123 and hose 124 to the manifold 116. As the air rich air-water mixture replaces the air poor pure water content of the conduits 109, the negative buoyancy of a portion of the cover 12 is overcome and the cover floats to the surface as shown in FIG. 28.

It is to be understood that a negligible amount by volume of air is incorporated in normal pool water, i.e., without air injection, thus to this extent pool water is a mixture of air and water. However, for positive buoyancy effect as employed herein a substantial amount of air is injected into the water to effect a substantial change in its density, i.e., to make it substantially less dense than normal pool water.

Solar heating is obtained with the cover of FIG. 27 by timing flow of air rich pool return water through the cover to coincide with the hours of most intense solar radiation incident on the cover 12. The circulating pool water passing through the solar heating channels 109 picks up heat from the solar energy and returns the heated water to the pool. If a clear plastic material is utilized for the panels 106, solar energy will be picked up in the channels 109 and will also pass through the cover into the pool. At night, the timer or controller 128 is set so that pool water is not circulated through the cover so that the trapped air in the channels 109 serves to enhance the thermal insulation of the cover 106.

In another alternative embodiment of the cover 106, it is made by extruding plastic material through a die and the upper surface and one-half of the web portions 108 are made of a clear plastic material, whereas the lower wall portion 111 and the lower half of the individual web portions 108 are made of a plastic having an opaque heat absorbing color such as black or blue.

Referring now to FIG. 34 there is shown an alternative weight structure of the type generally shown in FIGS. 8 and 24. The weight structure 17 includes a tubular conduit or container portion 133 which may be rigid or pliable and which contains therein the negative buoyancy weight member 134 having sufficient negative buoyancy to overcome the positive buoyancy of that portion of the cover 12 which is to be sunk for folding the cover 12. A chamber 135, preferably in the form of a conduit for the passage of pool water therethrough is serially connected with the pool return line 123. Air is injected or entrained with the return pool water flow so as to provide sufficient positive buoyancy with the air entrained therein to counteract at least a portion of the negative buoyancy of the weight so as to cause the cover 12 to float to the surface and to cause the cover to switch from a pool uncovered state to a pool covered state. As with the conduits 109, the conduit or chamber 135 is arranged so that in the case water is to flow therethrough that the exit port is below the water level in the conduit or chamber 135 so that air does not escape therefrom when the air-water mixture therethrough is stopped when the cover is in the pool covering state.

As an alternative embodiment to the cover of FIG. 27, the cover panels 106 need not be relatively rigid but may be flexible and generally pliable. The cover need not be made in panels and hinged together by means of hinges 14 but may comprise a unitary panel of flexible material having the solar heating channels or buoyancy changing channels 109 incorporated therein. The manifolding conduit 117 may then comprise merely a channel member of the type indicated at 78 in FIG. 23 extending laterally of the cover and communicating with individual channels 109 by means of apertures 81 communicating through the bottom wall 111 of the cover with the individual channels 109. Density of the flexible cover material is preferably slightly greater than the density of water so that the cover will sink when very little or no air is entrained in the flow of pool water through the channels 109. As in the other embodiments, the water is exhausted through the bottom wall of the cover in the manner as indicated at 85 in FIG. 23 so as to retain trapped air in the individual channels 109 when the flow of an air rich air and water mixture is stopped in the cover. When it is desired to switch the cover to an uncovering state the valve 127 is closed so that little or no air is introduced into the return pool water thus sweeping the entrained air from the previous mixture out of the channels 109 causing the cover to sink to the bottom of the pool. Since the cover is flexible it will follow the contour of the bottom of the pool. The flow of water through the various channels 109 will serve to cause the pool cover to retain its shape as it sinks in the pool. Likewise, when the cover is rising when a mixture of air and water is caused to flow through the channels 109, the cover will retain a generally extended shape due to the pressure of the air and water mixture within the cover. A suitable flexible plastic material which is resistant to pool chemicals and ultraviolet radiation is polyvinylchloride.

The pool cover embodiment of FIG. 27 has several advantages over those previously described with regard to FIGS. 1-26. More particularly, the air injector or venturi 125 eliminates the need for a special air compressor, pressure regulator and vent valve and control and substitutes the mere provision of a venturi with an air injecting tube which is commonly found in swimming pools, especially those including a therapy pool portion. Also, no additional lines are required for interconnecting the air injector and the pool cover since the air is merely injected into the pool return line. Also, the air injector need not be placed at the pool equipment pad but may be placed in the pool at the point where the pool return line returns to the pool or somewhere between that point and the cover so that, in this latter case, the pool equipment need not be changed in any way.

As an alternative to employing the venturi 125 for injecting the air into the pool return water for changing the buoyancy of the conduit portions 109 of the cover 12 for switching the cover between a covering and an uncovering state, the air compressor 31 and pressure regulator 32 may be employed for injecting air into the return line 124 or 123. In such a case, a valve may be employed for valving off the flow of the pool water so that essentially only air is injected into the pool return line 123 and hose 124, and thence through the various conduit portions 109 of the covers. This latter technique is preferred when a greater change in the buoyancy may be required in order to switch the cover 12 between the covering and uncovering states.

Also, the panels 106 facilitate a modular construction of the composite swimming pool cover so that standard modules may be employed for covering a wide variety of shapes and sizes of swimming pools. Furthermore, the cover incorporates a solar heating feature together with a change of buoyancy feature so that the solar heating channels may serve two purposes, namely for heating of the pool water and for effecting a change in the buoyancy of the cover so that the cover can switch from a covering state to an uncovering state and vice versa. By selecting the pool cover material for the panels to have a density greater than water and by sealing off a number, such as 20%, of the channels 109 entrapping air therein which are adjacent the hinge joints 14 which are to remain at the surface, the individual panels 106 need not include the foam 129 nor the weights 114, thereby facilitating fabrication and shipping the panels 106.

Referring now to FIGS. 35-37 there is shown an alternative embodiment of the present invention. The cover 12 of FIGS. 35-37 includes the panel portions 106 hinged together along hinge lines 107. Pool return water is fed into the channels 109 which are manifolded together in parallel arrays so as to conduct the pool water through the cover channels 109 in a generally serpentine manner, i.e., over a serpentine path as indicated by the flow arrows of FIG. 35. Pool water is preferably fed into the channels 109 via a flexible hose 124 coupled into the channels 109 at the untethered edge or end of the cover remote from the tethered side of the cover so that the buoyancy switching effect commences at the outboard edge of the cover and progresses toward the tethered edge, tethered by tethers 16 to the side of the pool 15.

The serpentine manifolding of the channels 109 within the panels 106 is conveniently accomplished by removing the webs 108 (see FIG. 28) between the adjacent closely spaced channels 109 near the end regions 41 of the cover 12. This is readily accomplished by reaching in from the open end region of the panels 106 and removing the web portions 108 near the end regions 141. The webs 108 are not removed at the side edges 142 of the turn around region of the serpentine path. A sufficient number of the septa 108 are removed near the end regions 141 so as to provide adequate volume of fluid flow therethrough so as not to present too large an impedance to flow of pool water through the cover 12. In a typical example, the serpentine flow path may comprise ten to forty individual channels 109 all connected in parallel and the parallel connection arranged in a serpentine manner as indicated in FIG. 35. The opposite ends of the panels 106 are merely heat sealed together along lines 143 thereby automatically defining the serpentine flow paths through the various panels 106.

As the fluid flow reaches the end of each of the serpentine paths in each panel 106 it exhausts from the panel and is coupled into the adjacent panel via the U-shaped flexible tubing 119. The flow of fluid is exhausted from the cover 12 via an output port 144 at the terminal end of the serpentine flow path 109. The output port 144 is preferably disposed at the end of the serpentine path which is adjacent the tethered side of the pool cover 12.

In this manner, the change in buoyancy effect, and particularly a change of buoyancy from negative buoyancy to positive buoyancy, commences at the untethered edge of the cover 12 and the change in buoyancy progressively moves toward the tethered edge of the cover. This facilitates unfolding of the cover without jumbling since the unrestrained edge of the cover 145 can move away from the tethered and folded portion of the cover more easily than the folded cover may move away from the tethered edge 146 of the cover 12. Venturi 125, pipe 126 and valve 127 can readily be installed at the exit port of the pool water return line 123 and in series with the flexible conduit 124. This facilitates installation of the cover 12 without changing any of the plumbing at the pool equipment pad.

Of course, in the alternative embodiment using the sinking tube 17 of FIG. 34, the sinking tubes 17 are arranged across the cover 12 in a serpentine flow path which is connected to the flexible hose so as to feed the water, air-water mixture, or air into the serpentine flow path from the untethered side edge as in the manner of FIG. 35.

What is claimed is:

1. In a method for making a swimming pool cover template the steps of:
   placing a sheet of translucent material over the swimming pool;
   feeding air at positive pressure under said sheet to hold it off the pool water as said sheet is placed over the swimming pool;
   weighting the margins of said sheet to hold it in position over said pool; and
   marking the translucent sheet as placed over the swimming pool to conform to the contour of the pool, whereby a template of the swimming pool is fabricated.

2. The method of claim 1 wherein the step of placing a sheet of translucent material over the swimming includes the step of unrolling the sheet of translucent material from an inflated spool disposed over the swimming pool.

* * * * *